(12) United States Patent
Goto et al.

(10) Patent No.: US 6,392,726 B2
(45) Date of Patent: *May 21, 2002

(54) SCREEN AND PRODUCTION DISPLAY APPARATUS USING THE SAME

(75) Inventors: Takeshi Goto; Toshihiro Suzuki; Tetsuya Kobayashi; Hisashi Yamaguchi, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,567

(22) Filed: Oct. 1, 1997

Related U.S. Application Data

(63) Continuation of application No. 08/402,210, filed on Mar. 10, 1995, now abandoned.

(30) Foreign Application Priority Data

Mar. 16, 1994 (JP) .............................. 6-046198

(51) Int. Cl.⁷ ...................... G02F 1/1333; G02F 1/1335
(52) U.S. Cl. ........................................... 349/86; 349/95
(58) Field of Search ................ 359/51, 72, 41, 359/69, 84, 85; 349/85, 116, 5, 112, 33

(56) References Cited

U.S. PATENT DOCUMENTS

| | | | | |
|---|---|---|---|---|
| 4,354,737 A | | 10/1982 | Dotsko et al. ............... 350/117 |
| 4,372,639 A | * | 2/1983 | Johnson ........................... 349/7 |
| 4,589,732 A | * | 5/1986 | Shiraishi et al. ............... 359/85 |
| 4,690,508 A | * | 9/1987 | Jacob .......................... 359/85 |
| 4,732,456 A | * | 3/1988 | Fergason et al. ............... 359/51 |
| 4,994,204 A | * | 2/1991 | Doane et al. .................. 359/51 |
| 5,099,343 A | * | 3/1992 | Margerum et al. ............ 359/69 |
| 5,103,327 A | * | 4/1992 | Hirai et al. .................... 359/51 |
| 5,136,403 A | * | 8/1992 | Jones et al. .................... 359/51 |
| 5,150,232 A | * | 9/1992 | Gunkima et al. .............. 359/51 |
| 5,153,756 A | * | 10/1992 | Ike ............................... 359/85 |
| 5,173,793 A | * | 12/1992 | Purcell ......................... 359/85 |
| 5,251,048 A | * | 10/1993 | Doane et al. .................. 359/51 |
| 5,416,617 A | * | 5/1995 | Loiseaux et al. .............. 359/51 |
| 5,448,382 A | * | 9/1995 | Land et al. .................... 359/51 |
| 5,525,273 A | * | 6/1996 | Konuma et al. ............... 359/51 |
| 5,530,571 A | * | 6/1996 | Chen et al. ................... 349/113 |
| 5,611,611 A | * | 3/1997 | Ogino et al. ................. 359/454 |
| 5,621,486 A | * | 4/1997 | Doany et al. ................. 349/62 |
| 5,644,369 A | * | 7/1997 | Jachimowicz et al. ........ 349/10 |

FOREIGN PATENT DOCUMENTS

| | | | | |
|---|---|---|---|---|
| EP | 0 168 180 | * | 1/1986 | ................... 359/52 |
| EP | 0 326 248 | * | 8/1989 | ................... 359/51 |
| JP | 59-195633 | * | 11/1984 | |
| JP | 62-204227 | | 9/1987 | |
| JP | 4-162019 | * | 6/1992 | ................... 359/69 |
| JP | 5-333306 | | 12/1993 | |
| JP | 6-110131 | | 4/1994 | |
| JP | 6-242511 | | 9/1994 | |
| JP | 6-265891 | | 9/1994 | |
| JP | 16301005 | | 10/1994 | |

* cited by examiner

Primary Examiner—Toan Ton
(74) Attorney, Agent, or Firm—Greer, Burns & Crain, Ltd.

(57) ABSTRACT

A screen has a screen main body, a power supply and a voltage regulator. The screen main body has a Fresnel lens, a polymer dispersed liquid crystal unit and a lenticular lens. The liquid crystal unit includes a polymer dispersed liquid crystal and a pair of transparent electrodes which sandwich the polymer dispersed liquid crystal. By operating the voltage regulator, a voltage applied to the electrodes is adjusted so that a gain of the liquid crystal is controlled.

27 Claims, 10 Drawing Sheets

SCREEN AND PRODUCTION DISPLAY APPARATUS USING THE SAME

This application is a continuation of application Ser. No. 08/402,210 filed on Mar. 10, 1995 now abandoned.

BACKGROUND ART

1. Field of the Invention

The present invention relates to screens and projection display apparatuses using the same, and more particularly to a screen and a projection display apparatus in which a scattering liquid crystal is used in addition to a conventional diffusing plate so that a gain (explained later) of the screen becomes variable.

2. Description of the Prior Art

FIG. 1 illustrates a conventional transmission screen 10, a projector 11 which emits image-forming rays of light 16, and an observer 12 who views an image displayed on the screen 1. The screen 10 includes a Fresnel lens 13, a diffusing plate 14 and a lenticular lens 15 integrated with each other.

The Fresnel lens 13 causes the image-forming rays of light 16 emitted by the projector 11 to converge. The diffusing plate 14 diffuses the rays of light output from the Fresnel lens 13 in a Y direction (the crosswise direction of the screen 10) and in a Z direction (the direction of the height of the screen 10). The lenticular lens 15 further diffuses the rays of light diffused by the diffusing plate 14.

Generally, the number of viewers or rightness of the surroundings vary depending on different circumstances in which the screen 10 is used, while the optical property of the conventional screen 10 is fixed and cannot be adjusted.

For this reason, there is a problem that the viewer may experience difficulty in viewing the image displayed on the screen 10.

SUMMARY OF THE INVENTION

Accordingly, an object of the present invention is to provide a screen and a projection display apparatus by which screen and apparatus the aforementioned problem is eliminated.

Another and more specific object of the present invention is to provide a projection display apparatus in which screen and a scattering liquid crystal is used, in addition to a conventional diffusing plate so that the gain of the screen becomes variable.

In order to achieve these objectives, the present invention provides a screen including a gain controller for changing a ratio (gain) of luminance at a light-outgoing face of the screen to luminance at a light-incident face of the screen. According to the screen of the present invention, the observable area can be changed to be best adapted to the condition in which the screen is used.

The present invention also provides a screen, wherein the gain controller includes: a pair of transparent electrodes opposite to each other; a scattering liquid crystal disposed between the pair of transparent electrodes; and a voltage regulator for adjusting a voltage applied to the pair of transparent electrodes. According to this aspect of the present invention, the gain of the screen can be stably controlled by adjusting the gain of the scattering liquid crystal.

Alternatively, the screen may include a Fresnel lens at which an image-forming light is incident on the screen; and a lenticular lens from which the image-forming light outgoes from the screen, wherein the gain controller may be disposed between the lenticular lens and the Fresnel lens. In another alternative constitution, the gain controller is provided to face the surface of the Fresnel lens from which surface the image-forming light outgoes, and the scattering liquid crystal constituting a part of the gain controller has a lenticular lens surface on its face from which face the image-forming light is output. According to these aspects of the present invention, the observable area can be changed to be best adapted to the condition in which the screen is used.

The present invention also provides a screen further including a transparent base which has a surface having discrete depressions, the surface facing the Fresnel lens, wherein the gain controller is provided on the surface of the transparent base which surface faces the Fresnel lens, and the scattering liquid crystal constituting a part of the gain controller has a lenticular lens surface on its face from which face the image-forming light is output. According to this aspect of the present invention, the distance between the liquid crystal and the lenticular lens surface is virtually zero. As a result, it is possible to display an image with higher resolution than a screen in which a separate lenticular lens is provided.

Alternatively, the screen may include a reflecting layer for reflecting the image-forming light emitted by a projector, and the gain controller is provided between the projector and the reflecting layer. According to this aspect of the present invention, the observable area can be changed to be best adapted to the condition in which the screen is used.

The present invention also provides a screen further including a brightness detector for detecting brightness of the surroundings, wherein an output from the brightness detector is used to operate the gain controller. According to this aspect of the present invention, it is possible to adjust the brightness of a displayed image in accordance with the variation of the brightness of the surroundings so that it becomes easier for a viewer to view the display.

The present invention also provides a projection display apparatus including: a body; a projector provided in the body; and a screen attached to the body, the screen comprising a gain controller for changing a ratio (gain) of luminance at a light-outgoing face of the screen to illuminance at a light-incident face of the screen.

Preferably, the gain controller of the screen of the projection display apparatus includes: a pair of transparent electrodes opposite to each other; a scattering liquid crystal disposed between the pair of transparent electrodes; and a voltage regulator for adjusting a voltage applied to the pair of transparent electrodes.

Preferably, the screen further comprises: a Fresnel lens at which an image-forming light is incident on the screen; and a lenticular lens at which the image-forming light is output from the screen, and the gain controller is disposed between the lenticular lens and the Fresnel lens.

Preferably, the gain controller is provided to face the surface of the Fresnel lens from which surface the image-forming light is output, and the scattering liquid crystal constituting a part of the gain controller has a lenticular lens surface on its face from which face the image-forming light is output.

Preferably, the screen further includes a transparent base which has a surface having discrete depressions, the surface facing the Fresnel lens.

Preferably, the screen further includes a brightness detector for detecting brightness of the surroundings, and an output from the brightness detector is used to operate the gain controller.

The present invention also provides a projection display apparatus including: a body; a projector provided in the body; and a screen having a gain controller for changing reflecting capability of the screen, wherein the screen further includes a reflecting layer for reflecting the image-forming light emitted by the projector, and the gain controller is provided between the projector and the reflecting layer.

Preferably, the screen of the above projection display apparatus further includes a brightness detector for detecting brightness of the surroundings, and an output from the brightness detector is used to operate the gain controller.

The present invention also provides a display method in a projection display apparatus having a projector and a screen, wherein the screen has a gain controller, the display method including the step of: adjusting a gain of the screen by using the gain controller.

Preferably, the gain controller employed in the display method has a scattering liquid crystal being disposed between a pair of transparent electrodes, and the adjusting of the gain being carried out by adjusting a voltage applied to the pair of transparent electrodes.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

[First Embodiment]

Figure 1:
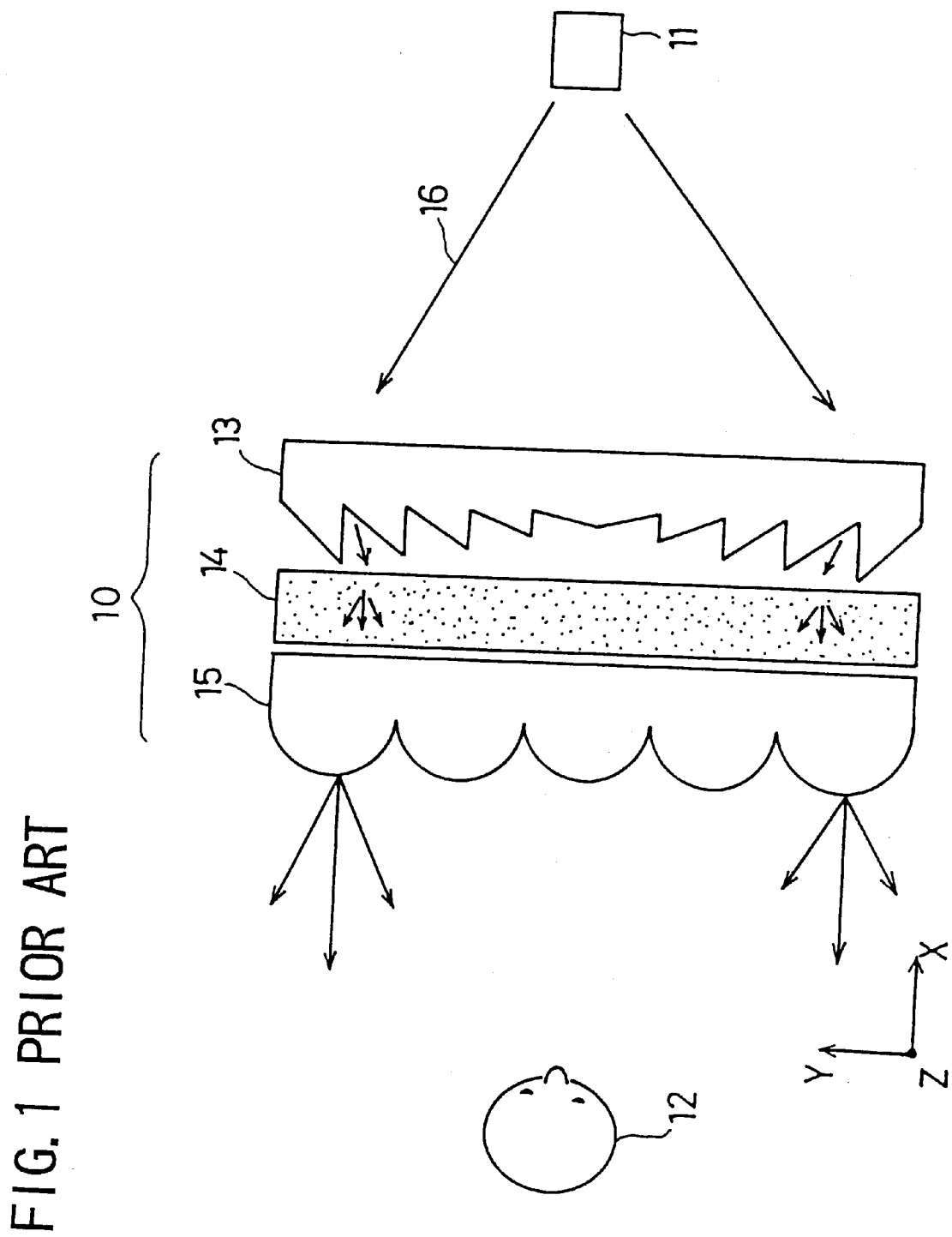
FIG. 1 illustrates a conventional screen.
Figure 2:
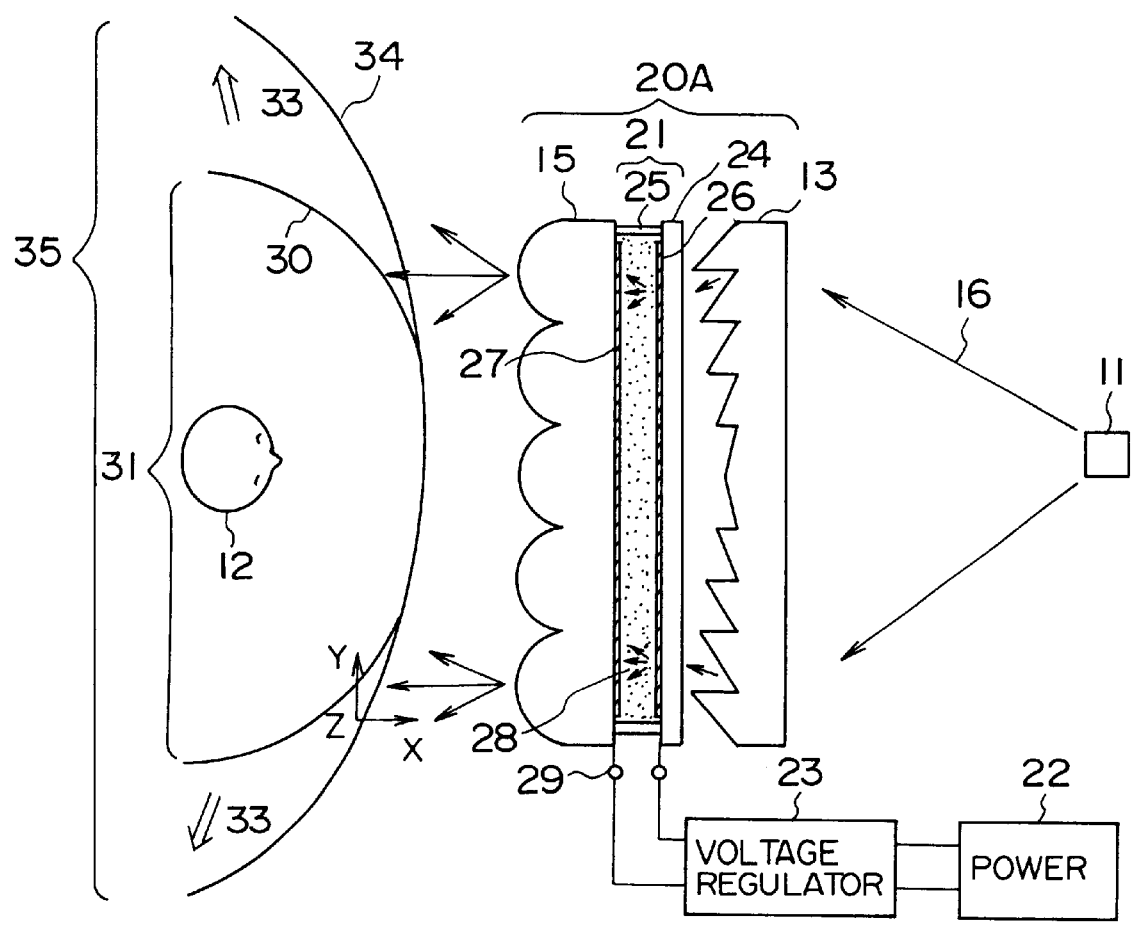
FIG. 2 illustrates a screen according to a first embodiment of the present invention.

FIG. 2 illustrates a transmission screen 20 according to a first embodiment of the present invention. The screen 20 is used in a rear projection display apparatus. In the figure, those components that are the same as the components of FIG. 1 are designated by the same reference numerals.

The screen 20 has a screen main body 20A, a power supply 22 and a voltage regulator 23. The screen main body 20A has a Fresnel lens 13, a lenticular lens 15 and a polymer dispersed liquid crystal unit 21.

The polymer dispersed liquid crystal unit 21, the power supply 22 and the voltage regulator 23 constitute a gain controller.

Viewed from the projector 11, the Fresnel lens 13, the polymer dispersed liquid crystal unit 21 and the lenticular lens 15 are arranged in the stated order. The rays of light emitted by the projector 11 enter the screen 20 at the Fresnel lens 13 and outgoes from the screen 20 at the lenticular lens 15.

The polymer dispersed liquid crystal unit 21 is integral with the lenticular lens 15, and has a transparent base 24, a seal member 25, a transparent mat electrode 26 disposed on the entirety of the transparent base 24, a transparent mat electrode 27 disposed on the entirety of the lens 15, a polymer dispersed liquid crystal 28 sealed by the seal member 25, and terminals 29 that lead from the transparent mat electrodes 26 and 27. The liquid crystal 28 has a structure in which liquid crystal droplets are dispersed in a sponge-like polymer.

The voltage regulator 23 is connected to the terminal 29.

The image-forming rays of light 16 from the projector 11 are made to converge by the Fresnel lens 13 and diffused by the polymer dispersed liquid crystal unit 21 in the Y and Z directions. The rays of light 16 are further diffused by the lenticular lens 15 in the Y direction and then exit from the screen 20 so as to be directed toward the viewer 12.

A description will now be given of a gain, a luminance ratio and an observable area.

A gain for a given spot in the liquid crystal unit 21 (or the screen 20) is defined by the following equation.

$$\frac{\text{luminance at light-outgoing face}}{\text{illuminance at light-incident face} \times \pi}.$$

It is to be noted that the greater the gain, the smaller the degree that the rays of light are diffused. The smaller the gain, the greater the degree that the rays of light are diffused, resulting in a darker image viewed from the front.

A luminance ratio is defined, on an assumption that the viewer views the entirety of the screen 20, by the following equation $$\frac{\text{luminance at brightest spot}}{\text{luminance at darkest spot}}.$$

It is to be noted that the greater the luminance ratio, the more irregular the brightness of display.

An observable area is defined as an area in which it is easy for the viewer to observe the screen 20 comfortably. For example, an observable area may be an area in which the luminance ratio is below 3.

A description will now be given of the operation of the polymer dispersed liquid crystal unit 21.

When the level of a voltage applied to the transparent mat electrodes 26 and 27 is changed, the arrangement of the droplets in the liquid crystal changes. As a result, the scattering behavior of the incident rays of light changes, and the gain of the liquid crystal unit changes as indicated by the line I of FIG. 3.

A description will now be given of the operation of the screen 20A having the aforementioned construction.

Figure 3:
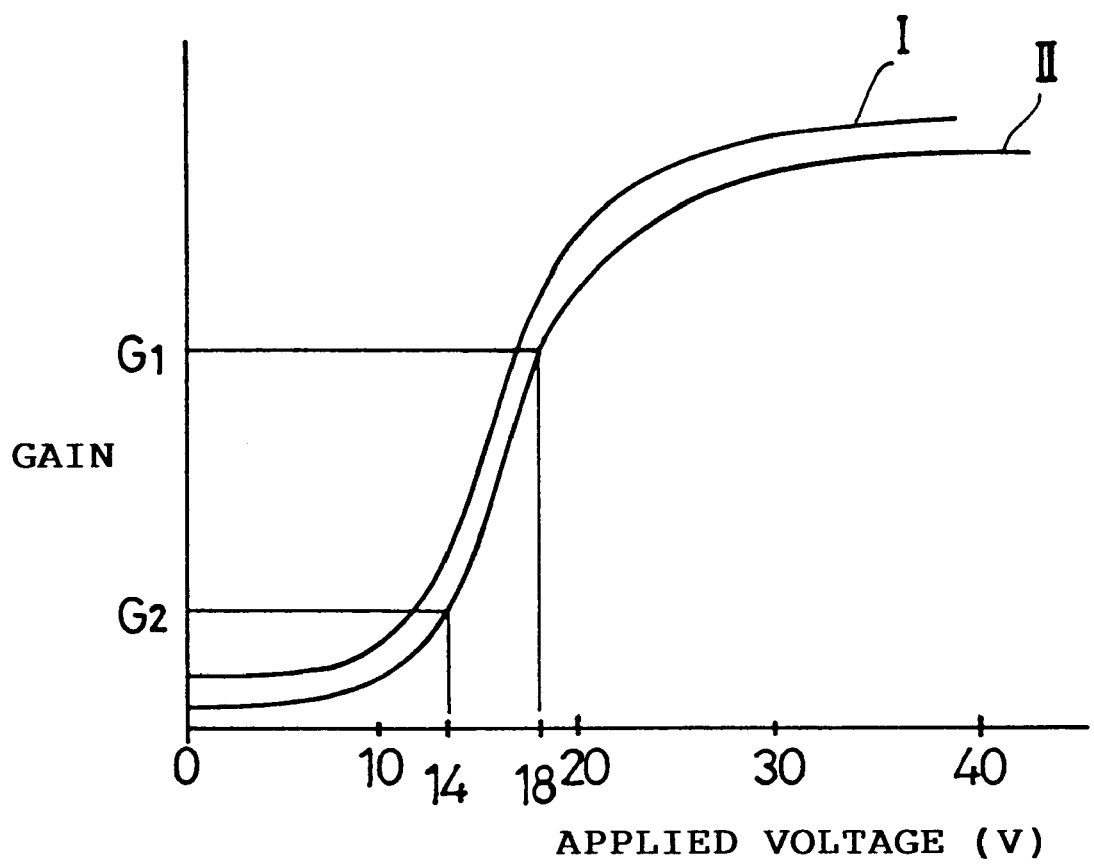
FIG. 3 illustrates how the gain of the screen of FIG. 2 is adjusted.

When the voltage regulator 23 is operated to adjust the voltage applied to the transparent mat electrodes 26 and 27, the gain of the liquid crystal unit 21 changes as indicated by the line I, resulting in the gain of the screen 20A changing as indicated by the line II of FIG. 3

When the gain of the screen 20A changes, the diffusing behavior of the rays of light changes, and the observable area changes.

Generally, a lower gain results in a wider observable area.

When the gain is lowered, the display on the screen 20 becomes less bright. Normally, a voltage of 18 V is supplied from the voltage regulator 23 to the screen 20A. In this normal state, the screen 20 has a gain G1, and, as shown in FIG. 2, an observable area 31 indicated by a line 30 results.

A description will now be given of operations executed in different situations.

(1) Case 1—the number of viewers increases

When the number of viewers increases to the extent that some viewers are diagonally opposite to the screen 20, the voltage regulator 23 is operated to lower the output voltage to, for example, 14 V.

As a result of this operation, the gain of the screen 20 is lowered to G2 indicated in FIG. 3.

Consequently, the observable area expands in a direction indicated by arrows 33 of FIG. 2. An observable area 35 delineated by a line 34 results.

Thus, the viewers who are diagonally opposite to the screen 20A are able to view the image on the screen 20A.

(2) Case 2—the surroundings become darker

When the surroundings become darker, the voltage regulator 23 is operated to lower the output voltage slightly.

As a result, the gain of the screen 20A is lowered slightly, and the brightness of the screen 20A drops slightly so that it becomes easy for the viewer to view the display comfortably. That is, the screen 20A is not excessively bright any more.

[Second Embodiment]

Figure 4:
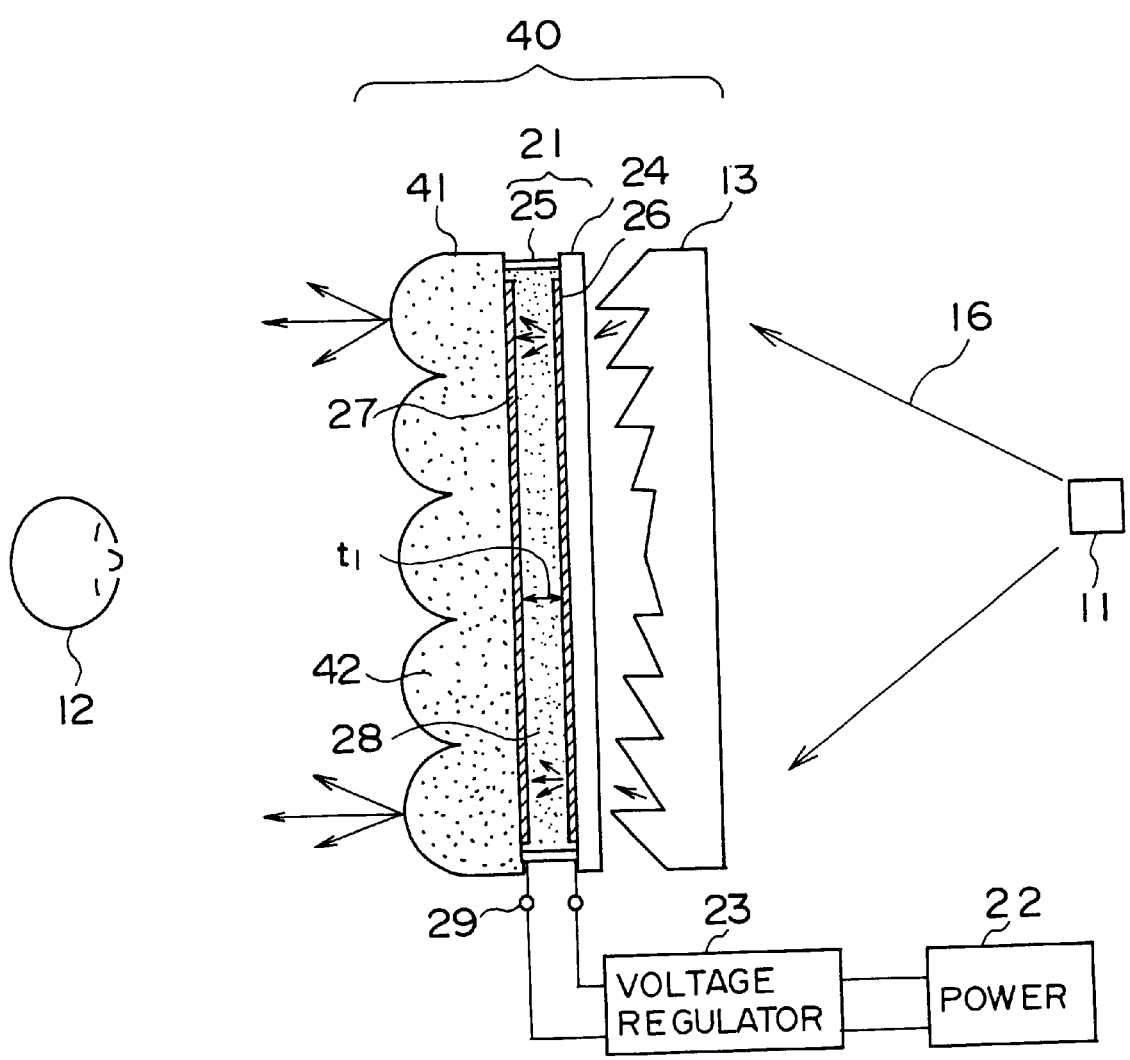
FIG. 4 illustrates a screen according to a second embodiment.

FIG. 4 illustrates a transmission screen 40 according to a second embodiment of the present invention.

The screen 40 has the same construction as the screen 20A of FIG. 2 except that a lenticular lens 41, instead of the lenticular lens 15, is provided. In FIG. 4, those components that are the same as the components of FIG. 2 are designated by the same reference numerals, and the description thereof is omitted.

The gain of the screen 40 is variable in a manner similar. to the screen 20A.

Beads 42 are dispersed in the lenticular lens 41. In comparison to the lenticular lens 15, the lenticular lens 41 diffuses the rays of light to a greater degree.

The screen 40 is effective in case the gain cannot be satisfactorily lowered using only the polymer dispersed liquid crystal unit 21.

The lenticular lens 41 has a bias gain. This additional gain of the lenticular lens 41 gives a margin by which the gain of the polymer dispersed liquid crystal unit 21 may be larger. Specifically, a thickness t1 of the polymer dispersed liquid crystal 28 may be reduced accordingly so that the amount of liquid crystal 28 used in the screen 40 is reduced, resulting in a corresponding drop in the price of the screen 40.

[Third Embodiment]

Figure 5:
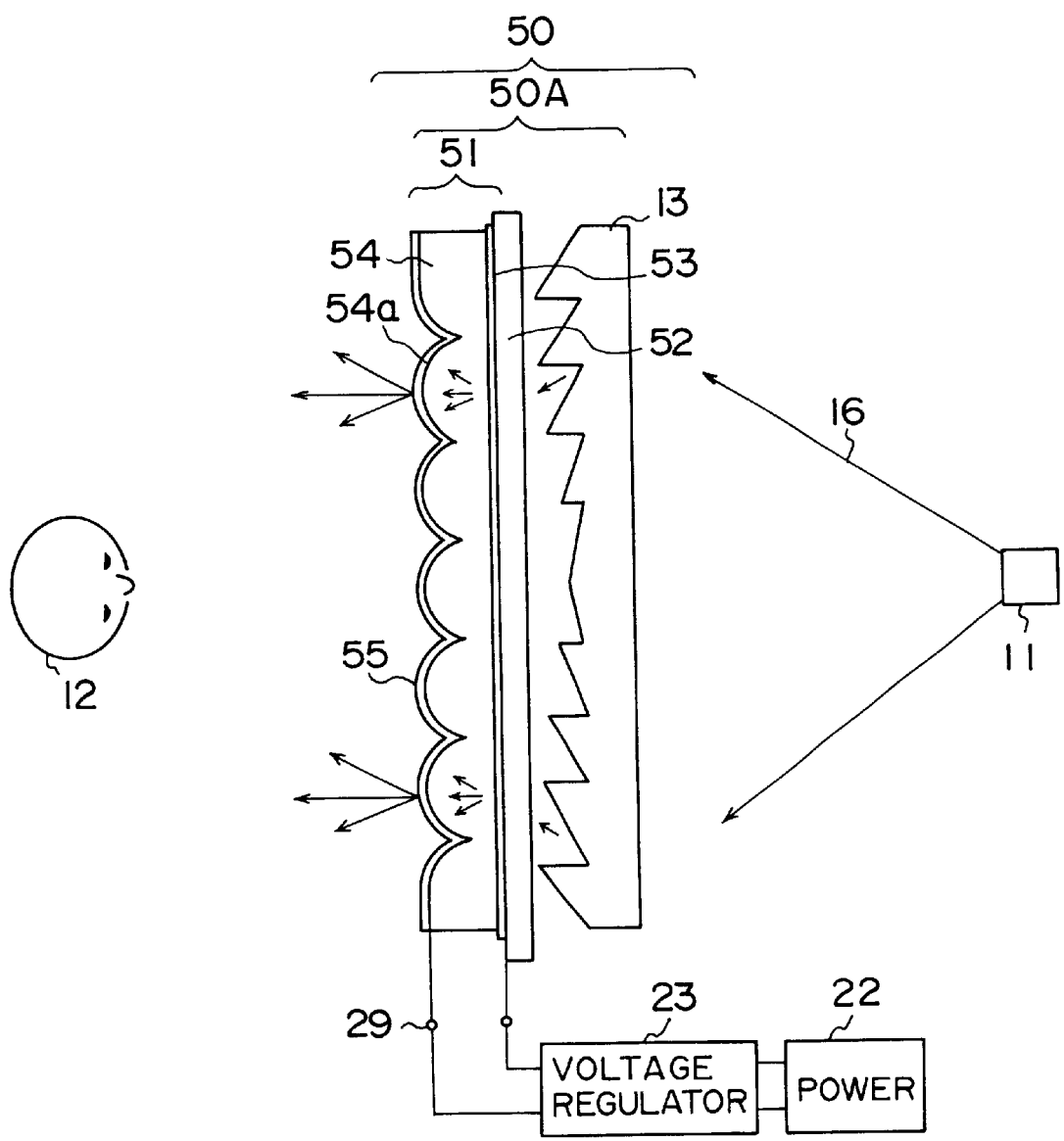
FIG. 5 illustrates a screen according to a third embodiment.

FIG. 5 illustrates a transmission screen 50 according to a third embodiment.

In the figure, those components that are the same as the components of FIG. 3 are designated by the same reference numerals, and the description thereof is omitted.

The screen 50 has a screen main body 50A, the power supply 22 and the voltage regulator 23.

The screen main body 50A has the Fresnel lens 13 and a polymer dispersed liquid crystal unit 51.

The polymer dispersed liquid crystal unit 51 has a transparent base 52, a transparent mat electrode 53 disposed on the transparent base 52, a solid polymer dispersed liquid crystal plate 54 whose major surface is formed to be a lenticular lens surface 54a, and a transparent mat electrode 55 on top of the lenticular lens surface 54a of the polymer dispersed liquid crystal 54. The lenticular lens surface 54a constitutes an exit for the rays of light.

Similarly to the first embodiment, the gain of the polymer dispersed liquid crystal 54 is changed by adjusting a voltage applied to the transparent mat electrodes 53 and 55. As a result, the gain of the screen 50 is changed so that the property of the screen 50 becomes adapted to the condition in which it is used.

The lenticular lens surface 54a diffuses the rays of light output from the polymer dispersed liquid crystal 54.

Since the major surface of the polymer dispersed liquid crystal 54 is formed to be the lenticular lens 54a, a lenticular lens is not provided in the screen 50. Accordingly, the screen 50 is thinner and lighter than the screens 20A and 40.

In the above-described construction, in which a lenticular lens is not provided, the distance, in a direction of the thickness of the screen 50, between the liquid crystal 54 and the lenticular lens surface 54a is virtually zero. Therefore, the screen 50 is capable of providing an image with higher resolution than the screens 20A and 40.

The polymer dispersed liquid crystal unit 51 is produced in accordance with the following steps.

(1) A polymer dispersed liquid crystal that is dissolved using an organic solvent is cast in a die formed with discrete depressions corresponding to the lenticular lens surface.

(2) The transparent base 52 formed with a transparent mat electrode 53 is mounted on the upper major surface of the liquid crystal.

(3) Volatilize the organic solvent so that the liquid crystal becomes solid.

(4) Remove the liquid crystal from the die and form the transparent mat electrode 55 on the lenticular lens surface of the liquid crystal by deposition.

[Fourth Embodiment]

Figure 6:
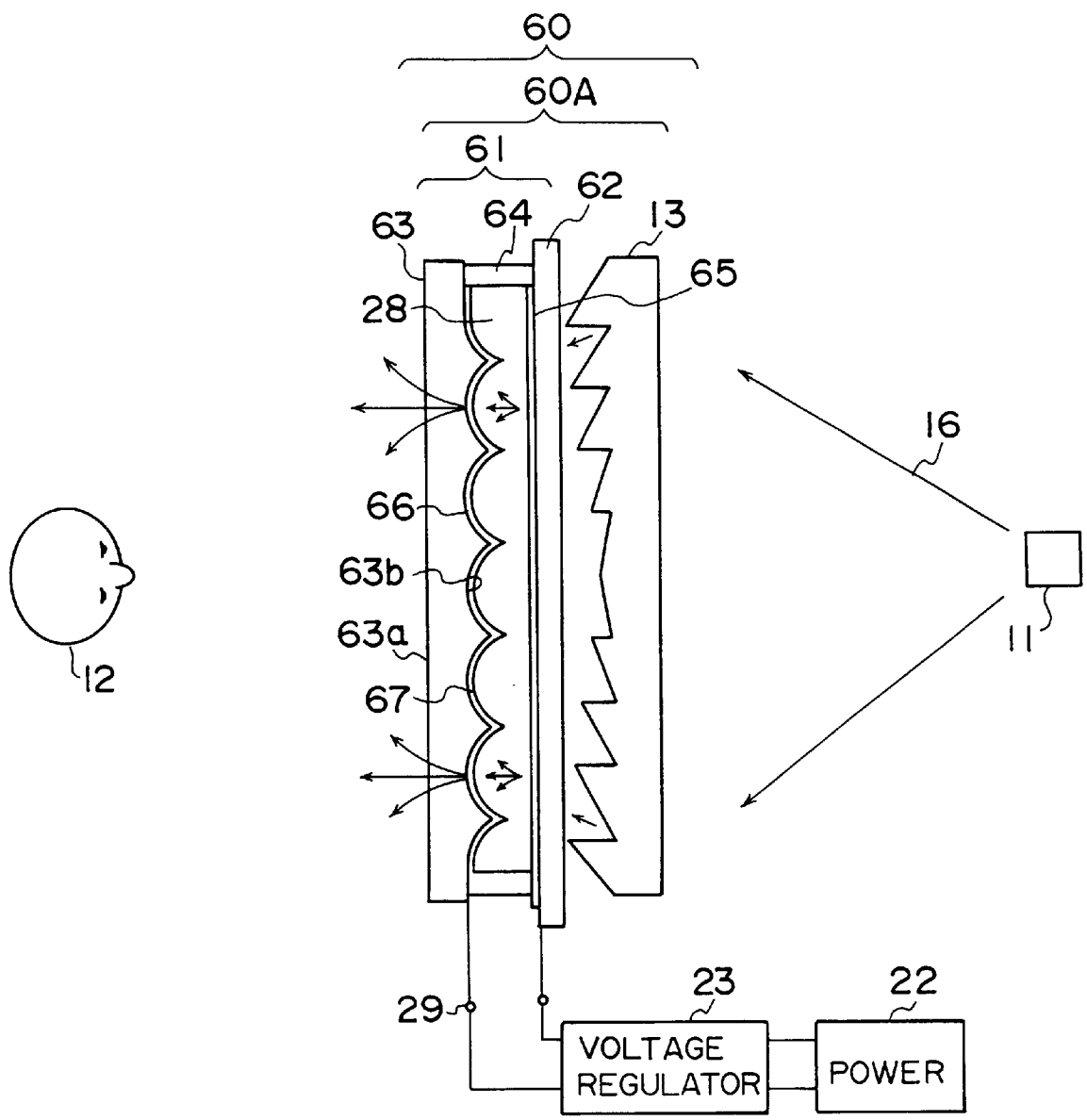
FIG. 6 illustrates a screen according to a fourth embodiment.

FIG. 6 illustrates a transmission screen 60 according to a fourth embodiment.

In the figure, those components that are the same as the components of FIG. 2 are designated by the same reference numerals, and the description thereof is omitted.

The screen 60 has a screen main body 60A, the power supply 22 and the voltage regulator 23.

The screen main body 60A has the Fresnel lens 13 and a polymer dispersed liquid crystal unit 61.

The polymer dispersed liquid crystal unit 61 has a flat transparent base 62, a molded transparent base 63, a seal member 64 and the polymer dispersed liquid crystal 28 sealed between the transparent bases 62 and 63, the bases 62 and 63 being opposite to each other.

A transparent mat electrode 65 is formed on the inner surface of the transparent base 62.

The molded transparent base 63 has a flat outer surface 63a and an inner surface 63b, the rays of light outgoing from the surface 63a, and surface 63b having discrete depressions corresponding to the lenticular lens surface. A transparent mat electrode 66 is formed on the surface 63b.

The polymer dispersed liquid crystal 28 has a lenticular lens surface 67 facing the transparent base 63.

Similarly to the first embodiment, the gain of the polymer dispersed liquid crystal 28 is variable by adjusting the voltage applied to the transparent mat electrodes 65 and 66. Accordingly, the gain of the screen 60 can be changed so that the property of the screen 60 is adapted to the condition in which it is used.

Similarly to the screen 50 of FIG. 5, since the surface of the liquid crystal 28 is formed to be a lenticular lens surface 67, the screen 60 is capable of providing an image with high resolution.

[Fifth Embodiment]

Figure 7:
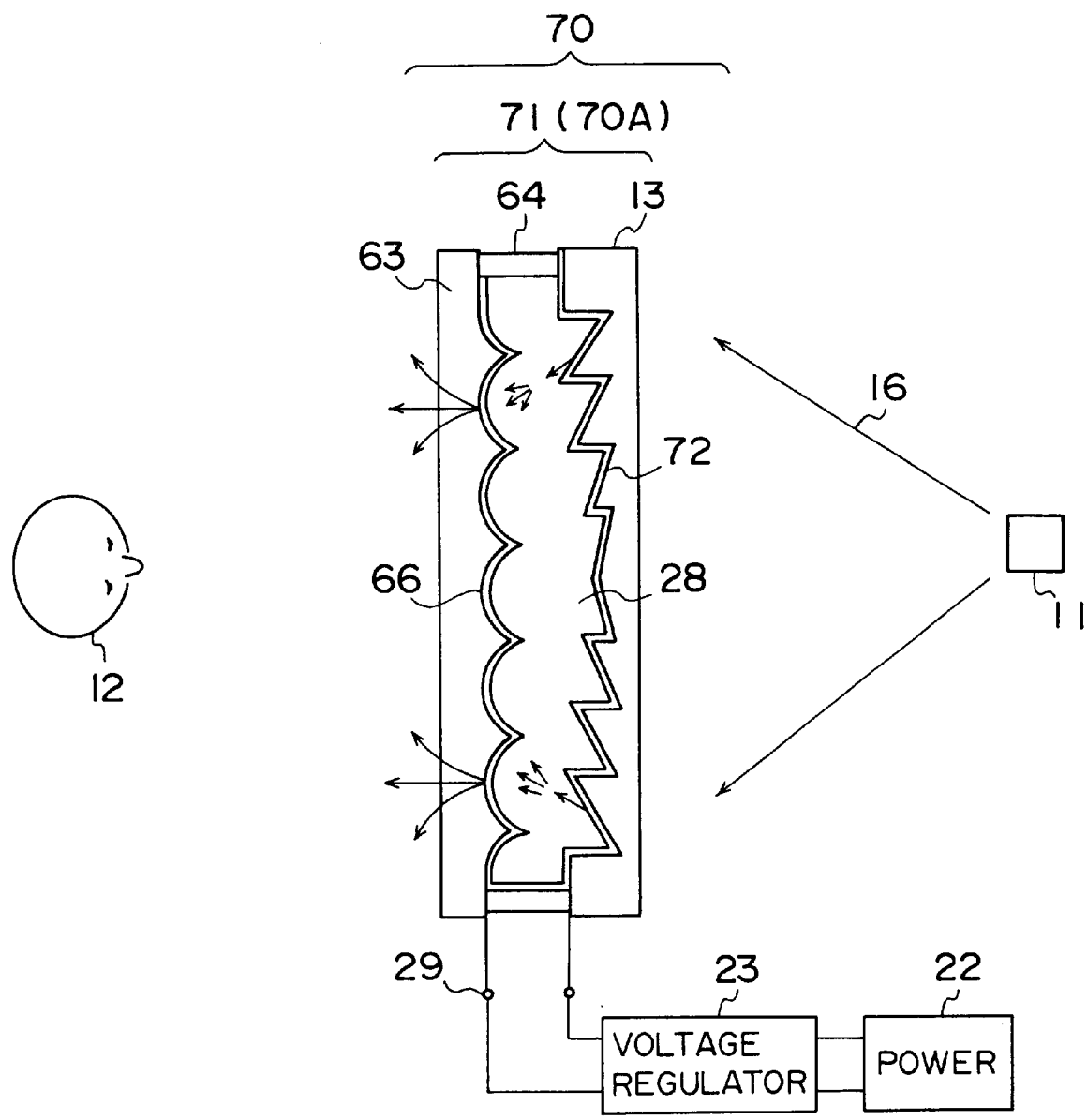
FIG. 7 illustrates a screen according to a fifth embodiment.

FIG. 7 illustrates a transmission screen 70 according to a fifth embodiment.

In the figure, those components that are the same as the components of FIGS. 2 and 6 are designated by the same reference numerals, and the description thereof is omitted.

The screen 70 includes: a polymer dispersed liquid crystal unit 71 constituting a screen main body 70A; the power supply 22; and the voltage regulator 23.

The polymer dispersed liquid crystal unit 71 has the Fresnel lens 13, the transparent base 63, the seal member 64, and the polymer dispersed liquid crystal 28 sealed between the Fresnel lens 13 and the transparent base 63, the Fresnel lens 13 and the transparent base 63 being fixed to be opposite to each other.

A transparent mat electrode 72 is formed on the inner surface of the Fresnel lens 13.

Similarly to the fourth embodiment, the gain of the polymer dispersed liquid crystal 28 is changed by adjusting the voltage applied to the transparent mat electrodes 66 and 72. As a result, the gain of the screen 70 is changed so that the property of the screen 70 becomes adapted to the condition in which it is used.

If a warp occurs in the Fresnel lens 13, an irregularity in the resolution of the screen results. It will be noted that the Fresnel lens 13 of the fifth embodiment constitutes a part of the liquid crystal unit 71. Hence, it is less likely for a deformation like a warp to occur in the Fresnel lens 13 of the fifth embodiment even after a certain period of time than in the Fresnel lens 13 of the screen 50 shown in FIG. 5 wherein the Fresnel lens 13 is separate from the liquid crystal unit 51.

Accordingly, the screen 70 has a satisfactory durability.

[Sixth Embodiment]

Figure 8:
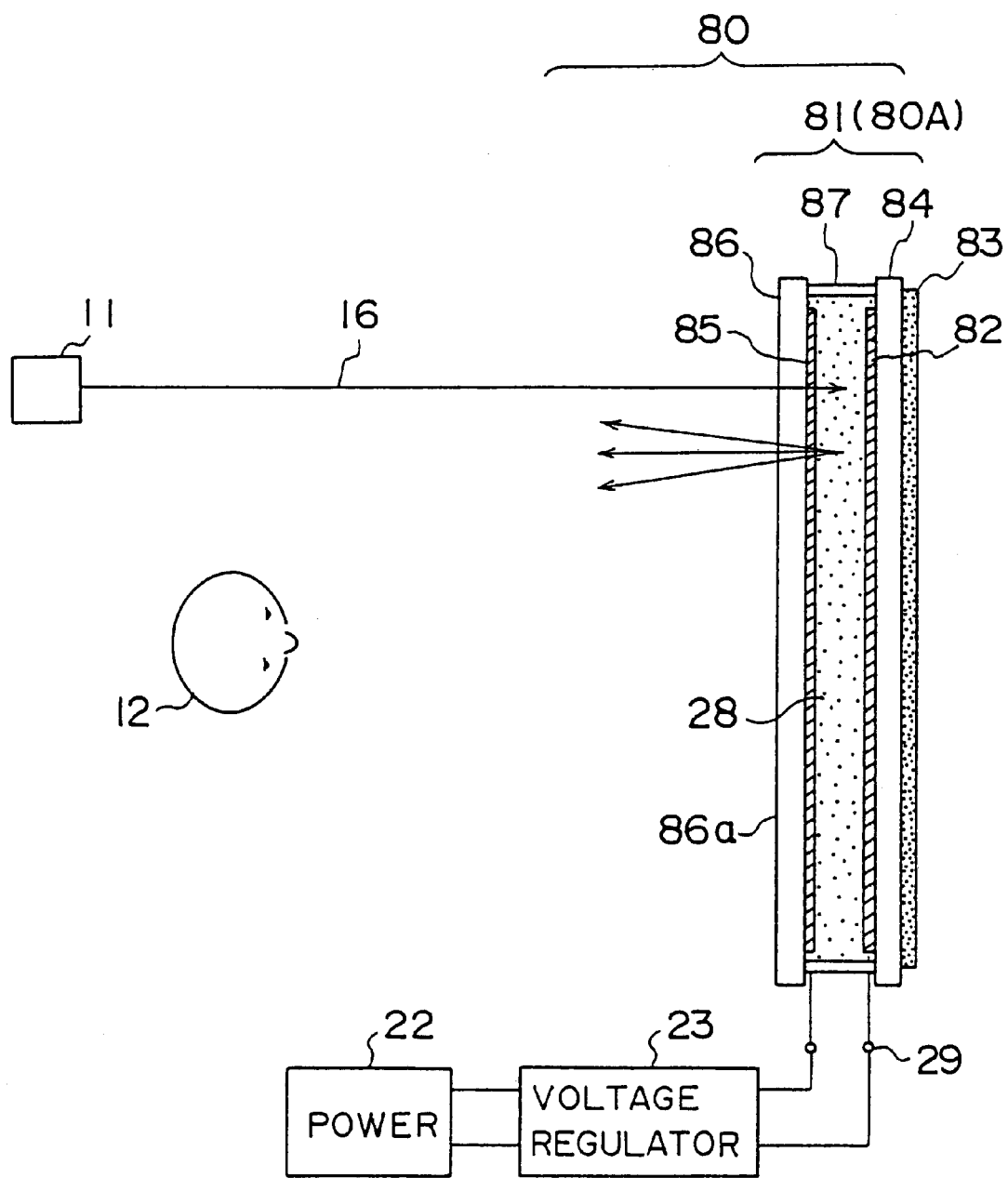
FIG. 8 illustrates a screen according to a sixth embodiment.

FIG. 8 illustrates a reflection screen 80, used in a front projection display apparatus or the like, according to a sixth embodiment.

The screen 80 includes: a polymer dispersed liquid crystal unit 81 constituting the screen main body 80A; the power supply 22; and the voltage regulator 23.

The polymer dispersed liquid crystal unit 81 includes; a transparent base 84 having a transparent mat electrode 82 on its one face and a reflecting layer 83 on its other face; and a transparent base 86 having a transparent mat electrode 85, the transparent mat electrodes 82 and 85 being fixed to be opposite to each other, and the polymer dispersed liquid crystal 28 being sealed between the transparent bases 84 and 86.

The image-forming rays of light 16 from the projector 11 are incident on a surface 86a of the transparent base 86, an antiglare paint being applied on the surface 86a. The rays of light are reflected by the reflecting layer 83, diffused by the liquid crystal 28, and directed toward the viewer 12.

The gain of the liquid crystal 28 is changed by operating the voltage regulator 23 to adjust the voltage applied to the transparent mat electrodes 82 and 85. As a result, the gain of the screen 80 is changed so that the property of the screen 80 becomes adapted to the condition in which it is used.

An aluminum film, instead of the transparent mat electrode 82 of FIG. 8, may be used. In this construction, the aluminum film provided in place of the transparent electrode 82 serves a combined function of an electrode and a reflecting layer. Thus, the reflecting layer 83 of FIG. 8 may be omitted.

[Variation]

In the foregoing embodiments, the polymer dispersed liquid crystal 28 may be replaced by any of the following three types of liquid crystals: (1) a dynamic scattering (DS mode) liquid crystal; (2) a ferroelectric (TS mode) liquid crystal; (3) a phase change (PC mode) liquid crystal; and (4) a liquid crystal having a thermooptical effect. All of these liquid crystals are scattering liquid crystals.

The liquid crystal used in the third and fourth embodiments may have a lenticular lens surface facing the projector 11.

[First Embodiment of Projection Display Apparatus]

Figure 9:
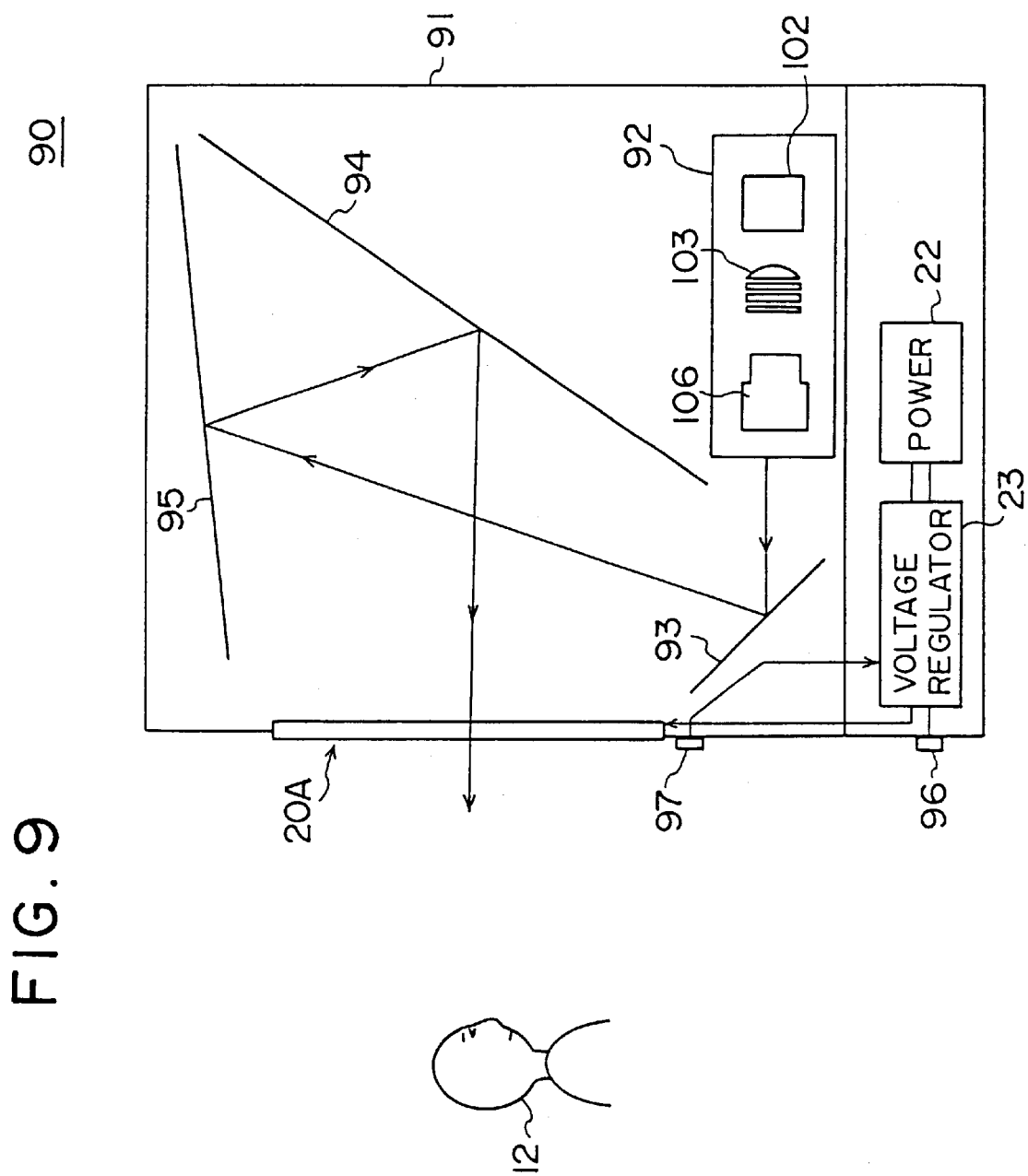
FIG. 9 illustrates a projection display apparatus which has the screen of FIG. 2.

FIG. 9 illustrates a projection display apparatus 90 according to the first embodiment.

A body 91 of the projection display apparatus 90 includes: the screen main body 20A shown in FIG. 2; the power supply 22; the voltage regulator 23; a projector 92; reflecting mirrors 93, 94 and 95; a voltage regulating knob 96; and a photosensor 97 (brightness detector).

Figure 10:
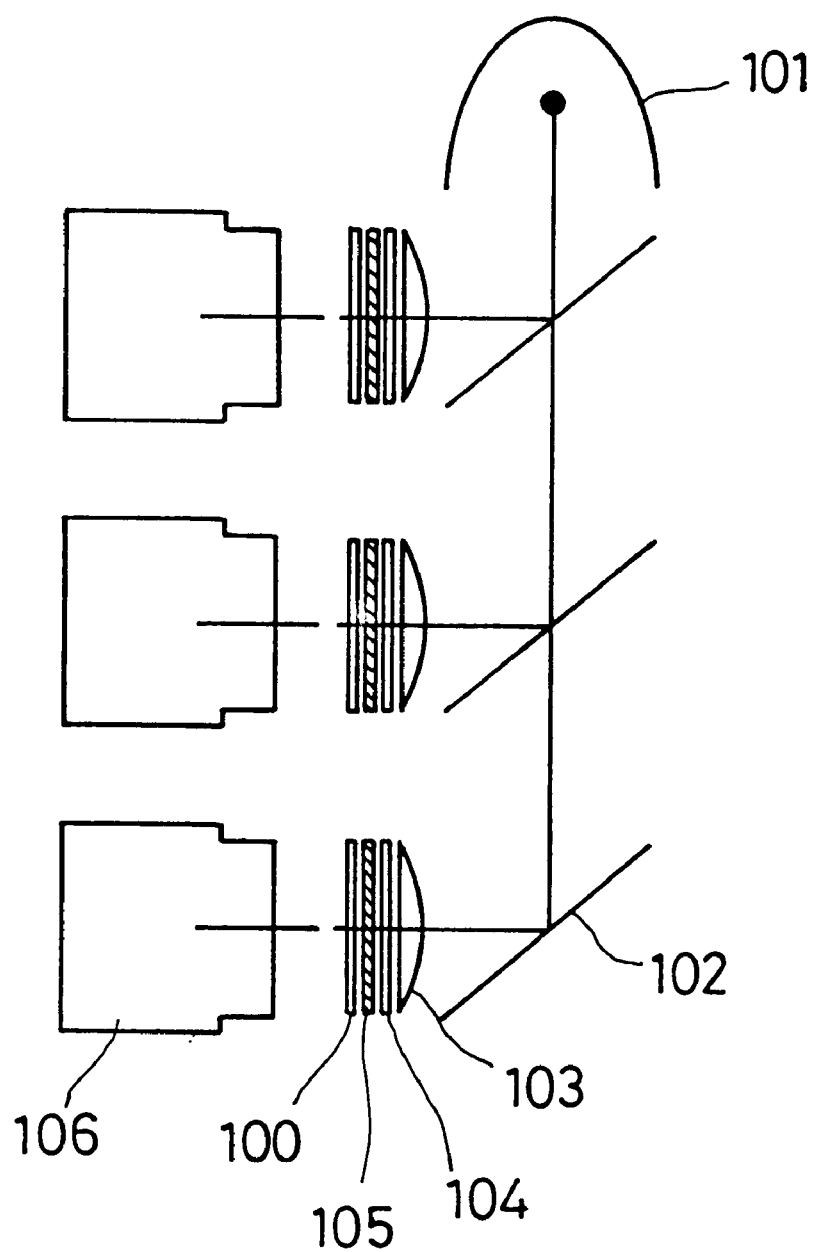
FIG. 10 illustrates a construction of a projector of FIG. 9.

As shown in FIG. 10, the projector 92 includes a liquid crystal panel 100; a light source 101; a dichroic mirror 102; a condenser lens 103; polarizing plates 104 and 105; and a projection lens 106.

The knob 96 in the projection display apparatus 90 is used to operate the voltage regulator 23 so that the voltage applied to the screen main body 20A is adjusted.

As a result, the gain of the screen main body 20A is changed so that the property of the projection display apparatus 90 is adapted to a condition in which it is used.

When the brightness in a room in which the apparatus 90 is located changes, the apparatus 90 operates as follows.

The photosensor 97 detects the brightness in the room and sends an associated signal to the voltage regulator 23. In this way, when it gets brighter in the room, the output voltage of the regulator 23 is increased. When it gets darker in the room, the output voltage of the regulator 23 is decreased.

Consequently, when the brightness in the room increases, the gain of the screen main body 20A is automatically increased. As a result, the display becomes brighter and it becomes easier for the viewer to view the display. When the brightness in the room decreases, the gain of the screen 20A is automatically decreased. As a result, the display becomes darker and it becomes easier for the viewer to view the display.

The present invention is not limited to the above described embodiments, and variations and modifications may be made without departing from the scope of the present invention.

What is claimed is:

1. A generally flat screen for receiving an image-forming light projected by a projector so as to provide an observable display to a viewer, comprising:

a gain controller for changing a ratio (gain) of luminance at a light-output face of the screen to illuminance at a light-incident face of the screen so that a gain of generally the entire screen is changed, thereby changing an observable area of the screen, said gain controller controlling the gain by controlling the degree of diffusion of light;

said gain controller controlling the gain within a continuous range, and the observable area is obtained by an arbitrary gain within said continuous range.

2. The screen as claimed in claim 1, wherein said gain controller comprises:

a pair of transparent electrodes opposite to each other;

a scattering liquid crystal disposed between said pair of transparent electrodes; and a voltage regulator for adjusting a voltage applied to said pair of transparent electrodes.

3. The screen as claimed in claim 2, further comprising:
a Fresnel lens at which an image-forming light is incident on the screen; and
a lenticular lens at which said image-forming light is output from the screen,
wherein said gain controller is disposed between said lenticular lens and said Fresnel lens.

4. The screen as claimed in claim 2, further comprising:
a Fresnel lens at which said image-forming light is incident on the screen,
wherein said gain controller is provided to face a surface of said Fresnel lens from which surface said image-forming light is output, and
said scattering liquid crystal constituting a part of said gain controller having a lenticular lens surface on its face from which face said image-forming light is output.

5. The screen as claimed in claim 2, further comprising:
a Fresnel lens at which said image-forming light is incident on the screen; and
a transparent base which has a surface having discrete depressions, said surface facing said Fresnel lens,
wherein said gain controller is provided on said surface of said transparent base which surface faces said Fresnel lens, and
said scattering liquid crystal constituting a part of said gain controller having a lenticular lens surface on its face from which face the image-forming light is output.

6. The screen as claimed in claim 2, further comprising a reflecting layer for reflecting the image-forming light emitted by a projector,
wherein said gain controller is provided between said projector and said reflecting layer.

7. The screen as claimed in claim 6, further comprising a brightness detector for detecting brightness of the surroundings, said detector being coupled to said gain controller,
wherein an output from said brightness detector is used to operate said gain controller.

8. The screen as claimed in claim 2, further comprising a brightness detector for detecting brightness of the surroundings, said detector being coupled to said gain controller,
wherein an output from said brightness detector is used to operate said gain controller.

9. The screen as claimed in claim 1, further comprising a brightness detector for detecting brightness of the surroundings, said detector being coupled to said gain controller
wherein an output from said brightness detector is used to operate said gain controller.

10. The screen as claimed in claim 2, wherein a liquid crystal layer is sandwiched between a light-transmissive base having a Fresnel lens surface and a light-transmissive base having a lenticular surface, the liquid crystal layer being provided with a Fresnel lens surface at which light enters and a lenticular lens surface from which light exits.

11. The screen as claimed in claim 1, wherein by controlling the gain, the screen provides optimum observation conditions for various observation requirements including one for a single viewer and one for multiple viewers.

12. A projection display apparatus comprising:
a body;
a projector provided in said body so as to project an image-forming light; and
a generally flat screen attached to said body so as to receive the image-forming light projected by said projector and provide an observable image to a viewer, said screen comprising a gain controller for changing a ratio (gain) of luminance at a light-outgoing face of the screen to illuminance at a light-incident face of the screen so that a gain of generally the entire screen is changed, thereby changing an observable area of the screen, said gain controller controlling the gain by controlling the degree of diffusion of light;
said gain controller controlling the gain within a continuous range, and the observable area is obtained by an arbitrary gain within said continuous range.

13. The projection display apparatus as claimed in claim 12,
wherein said gain controller of said screen comprises:
a pair of transparent electrodes opposite to each other;
a scattering liquid crystal disposed between said pair of transparent electrodes; and
a voltage regulator for adjusting a voltage applied to said pair of transparent electrodes.

14. The projection display apparatus as claimed in claim 13, wherein said screen further comprises:
a Fresnel lens at which an image-forming light is incident on said screen; and
a lenticular lens at which said image-forming light is output from said screen, and
said gain controller is disposed between said lenticular lens and said Fresnel lens.

15. The projection display apparatus as claimed in claim 13, wherein said screen further comprises:
a Fresnel lens at which an image-forming light is incident on said screen, and
said gain controller is provided to face a surface of said Fresnel lens from which surface said image-forming light is output, and
said scattering liquid crystal constituting a part of said gain controller having a lenticular lens surface on its face from which face said image-forming light is output.

16. The projection display apparatus as claimed in claim 13, wherein said screen further comprises:
a Fresnel lens at which an image-forming light is incident on said screen; and
a transparent base which has a surface having discrete depressions, said surface facing said Fresnel lens, and
said gain controller is provided on said surface of said transparent base which surface faces said Fresnel lens, and
said scattering liquid crystal constituting a part of said gain controller having a lenticular lens surface on its face from which face said image-forming light is output.

17. The projection display apparatus as claimed in claim 13, wherein said screen further comprises a brightness detector for detecting brightness of the surroundings, and
an output from said brightness detector is used to operate said gain controller.

18. The projection display apparatus as claimed in claim 12, wherein said screen further comprises a brightness detector for detecting brightness of the surroundings, and
an output from said brightness detector used to operate said gain controller.

19. The projection display apparatus as claimed in claim 12, wherein said projector comprises:

a light source;

a liquid crystal panel; and a projection lens.

20. The projection display apparatus as claimed in claim 12, wherein by controlling the gain, the screen provides optimum observation conditions for various observation requirements including one for a single viewer and one for multiple viewers.

21. A projection display apparatus comprising:

a body;

a projector provided in said body so as to project an image-forming light; and a generally flat screen for receiving the image-forming light projected by said projector so as to provide an observable image to a viewer, said screen having a gain controller for changing a reflecting capability of the screen so that a gain of generally the entire screen is changed, thereby changing an observable area of the screen, said gain controller controlling the gain by controlling the degree of diffusion of light, wherein said screen further comprises a reflecting layer for reflecting the image-forming light emitted by said projector, and said gain controller is provided between said projector and said reflecting layer and said gain controller controlling the gain within a continuous range, the observable area being obtained by an arbitrary gain within said continuous range.

22. The projection display apparatus as claimed in claim 21, therein said screen further comprises a brightness detector for detecting brightness of the surroundings, and an output from said brightness detector is used to operate said gain controller.

23. The projection display apparatus as claimed in claim 21, wherein said projector comprises:

a light source;

a liquid crystal panel; and a projection lens.

24. The projection display apparatus as claimed in claim 21, wherein by controlling the gain, the screen provides optimum observation conditions for various observation requirements including one for a single viewer and one for multiple viewers.

25. A display method in a rear-projection apparatus having a projector and a generally flat screen for receiving an image-forming light projected by the projector so as to provide an observable display to a viewer, wherein the screen has a gain controller for changing a ratio (gain) of luminance at a light-output face of the screen to illuminance at a light-incident face of the screen so that a gain of generally the entire screen is changed, thereby changing an observable area of the screen, the gain controller controlling the gain within a continuous range, the observable area being obtained by an arbitrary gain within the continuous range, said display method comprising the step of:

adjusting a gain of the screen by using said gain controller, wherein said gain controller controls the gain by controlling the degree of diffusion of light.

26. The display method as claimed in claim 25, wherein said gain controller has a scattering liquid crystal being disposed between a pair of transparent electrodes, and the adjusting of the gain being carried out by adjusting a voltage applied to said pair of transparent electrodes.

27. The display method as claimed in claim 25, wherein by controlling the gain, the screen provides optimum observation conditions for various observation requirements including one for a single viewer and one for multiple viewers.

* * * * *

UNITED STATES PATENT AND TRADEMARK OFFICE
CERTIFICATE OF CORRECTION

PATENT NO. : 6,392,726 B2
DATED : May 21, 2002
INVENTOR(S) : Goto et al.

It is certified that error appears in the above-identified patent and that said Letters Patent is hereby corrected as shown below:

Title page,
Item [54], in the title, delete "PRODUCTION" and insert -- PROJECTION --,
Item [56], References Cited, U.S. PATENT DOCUMENTS, delete "4,589,732" and insert -- 4,859,732 --, and
Item [30], FOREIGN PATENT DOCUMENTS, delete "16301005" and insert -- 6-301005 --.

Column 9,
Line 51, insert -- , -- after "controller".

Signed and Sealed this

Twenty-seventh Day of May, 2003

JAMES E. ROGAN
*Director of the United States Patent and Trademark Office*